United States Patent [19]
Tang

[11] Patent Number: 5,814,905
[45] Date of Patent: *Sep. 29, 1998

[54] CABLE TV MULTI-TAP WITH UNINTERRUPTABLE SIGNAL/POWER THROUGHPUT

[76] Inventor: Danny Q. Tang, 2 Taylorr Lake Ct., Manalapan, N.J. 07726

[ * ] Notice: The term of this patent shall not extend beyond the expiration date of Pat. No. 5,677,578.

[21] Appl. No.: 918,012

[22] Filed: Aug. 25, 1997

Related U.S. Application Data

[63] Continuation of Ser. No. 489,726, Jun. 13, 1995, Pat. No. 5,677,578.

[51] Int. Cl.$^6$ ........................................... H01B 7/30
[52] U.S. Cl. .................... 307/147; 307/119; 333/101; 333/105; 439/579
[58] Field of Search ..................................... 307/112, 113, 307/116, 119, 125, 147; 439/535, 218, 188, 578, 579, 581, 589; 333/100, 101, 105

[56] References Cited

U.S. PATENT DOCUMENTS

| 4,226,495 | 10/1980 | Palle et al. | 439/535 |
| 4,755,776 | 7/1988 | Preschutti | 333/100 |
| 5,581,134 | 12/1996 | Romerein et al. | 307/132 M |
| 5,677,578 | 10/1997 | Tang | 307/147 |

*Primary Examiner*—Jeffrey A. Gaffin
*Assistant Examiner*—Jonathan Kaplan
*Attorney, Agent, or Firm*—Watov & Kipnes, P.C.

[57] ABSTRACT

A multi-tap device for tapping a main TV or rf signal to deliver attenuated signals to individual TV receivers includes a pair of socket assemblies for receiving input and output pins of a plug-in tap plate or printed circuit board carrying necessary attenuation/tap off circuitry. The socket assemblies connect the input pin to a main input cable for receiving the main rf signal and ac power, and connect the output pin to a main output cable or continuation of the main cable, for distributing the main rf signal(s) and ac power to cascaded down line multi-tap devices. A shunt printed circuit board is mounted between the socket assemblies, and has an rf/ac conductive strip for connection at either end to switches built into each socket assembly. As a tap plate is removed or unplugged from the socket assemblies, the switches operate to close before the input and output pins are electrically disconnected from sockets of the socket assemblies, for electrical connecting the input and output cables together to insure that the rf signals and ac power is continuously delivered to down line multi-tap devices without interruption.

14 Claims, 11 Drawing Sheets

5,814,905

CABLE TV MULTI-TAP WITH UNINTERRUPTABLE SIGNAL/POWER THROUGHPUT

This is a Continuation, of application Ser. No. 08/489,726, filed Jun. 13, 1995, now U.S. Pat. No. 5,677,578.

FIELD OF THE INVENTION

The field of the present invention relates generally to cable television and rf signal distribution equipment, and more specifically to multi-taps.

BACKGROUND OF THE INVENTION

In cable TV and other rf distribution systems it is typically necessary to tap off a television or rf signal from a main distribution cable for bringing the television or rf signal into a customers facility on a secondary cable. The signal tapped off is generally substantially attenuated through use of a signal tapping device. A known device for accomplishing this is a multi-tap, that permits connection to the main television or rf signal carrying cable, and provides multiple outputs for individual connection to a number of customers, respectively. In a typical cable television distribution system, a plurality of multi-tap devices are connected as required along the length of a main signal line for tapping and distributing television signals to a plurality of the customers located in a vicinity of the areas where the main cable is strung. In such an installation, it is common practice to pass the main cable into one multi-tap at an input port thereof, and to continue the main cable from an output port of the multi-tap for connection to the input port of the next multi-tap down line. As more customers are added to the system, it may be necessary to lengthen the line, and/or to increase the level of power of the main television signal being conducted by the main cable. It is also typical to have the main distribution cable conduct both the television or rf signal along with the ac power necessary to energize the electronic circuitry of each of the multi-taps. It is often necessary to open one or more of the multi-taps connected in cascade, in order to change a tap plate for changing the attenuation or signal levels of the signals tapped off for connection to customers, in order to maintain the customers' signal level at an appropriate level of power (an appropriate db level).

With known multi-taps of the prior art, whenever tap plates must be removed for substituting a new tap plate to obtain higher or lower attenuation, or to repair a particular multi-tap, the main rf signal and associated ac power for the multi-taps down line of the multi-tap being serviced are interrupted or cut off from the down line multi-taps. Accordingly, all customers inclusive of the customers associated with the multi-tap being serviced, and those down line, have their television signal connections interrupted until the servicing of the multi-tap under repair or conversion is completed. Many attempts have been made to overcome this difficulty.

A major problem with known multi-tap devices having some built in switching mechanism for permitting manual closure, for example, after a tap plate is removed, to reconnect the rf signal and ac power to the down line multi-taps, still cause an interruption of rf signal power and ac power to the down line multi-taps until the switching mechanism is activated. The present inventor recognized the need for providing improved multi-tap devices that can be repaired or converted to higher or lower attenuation factors without any interruption of rf signal and ac power to down line multitaps.

SUMMARY OF THE INVENTION

An object of the invention is to provide a new and improved multi-tap device.

Another object of the invention is to provide a multi-tap apparatus or device that insures uninterrupted signal and power to down line multi-taps connected in cascade, whenever a tap plate of an upstream multi-tap is removed.

With the problems of the prior art in mind, the present invention includes a shunt printed circuit board having an electrically conductive path thereon for carrying an rf signal and ac power between main cable input and output connectors of the associated multi-tap device. Whenever a tap plate of the multi-tap device is removed, switching means are provided for automatically connecting the shunt conductor of the shunt printed circuit board between the main cable input and output connectors before the tap plate pin connectors are completely disconnected from electrical sockets of the main housing of the multi-tap device, which would cause interruption of the rf signal and associated ac power to the down line multi-taps in the absence of the switching means. In other words, the switching means is operative for making an electrical connection between the main cable input and output connectors of the multi-tap before the tap plate is completely electrically disconnected from the input and output rf cables connected to the associated multi-tap device.

BRIEF DESCRIPTION OF THE DRAWINGS

Various embodiments of the present invention are described below with reference to the drawings, in which like items are identified by the same reference designation, wherein.

DETAILED DESCRIPTION OF THE INVENTION

Figure 1:
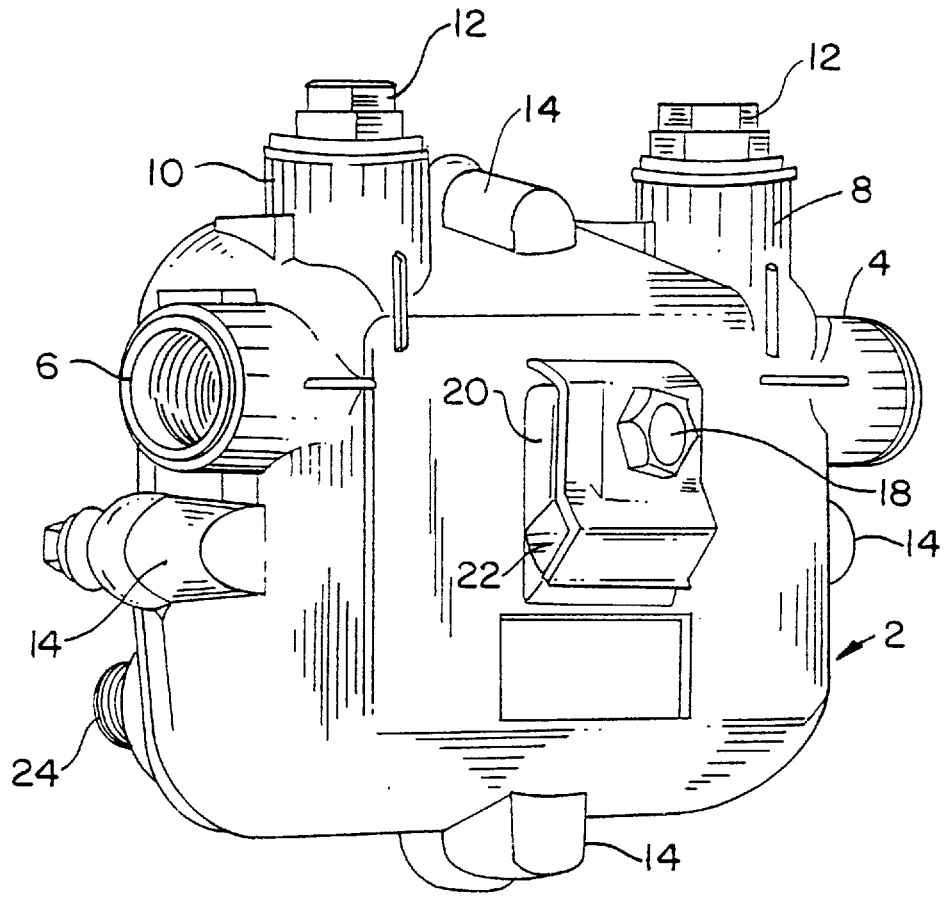
FIG. 1 is a pictorial drawing of the main housing portion of a known multi-tap device.

With reference to FIG. 1, the main housing 2 is shown to include in this example an in-line output port 4, an in-line input port 6, a parallel output port 8, a parallel input port 10 and port caps 12 screwed into the parallel output port 8 and parallel input port 10, respectively, in this example. Mounting bosses 14 are provided for securing a tap plate cover 26 to the other side of the housing 2 (see FIG. 2). A clamp plate 16 is secured to the housing 2 via a clamp bolt 18. A clamp boss 20 is provided for receiving the clamp plate 16 and clamp bolt 18. The clamp boss 20 also includes a clamp groove 22 for in combination with an opposing groove or channel of the clamp plate 16, permitting the multi-tap device to be secured to an appropriate mounting post or member (not shown). A portion of an output tap connector 24 is also shown.

Figure 2:
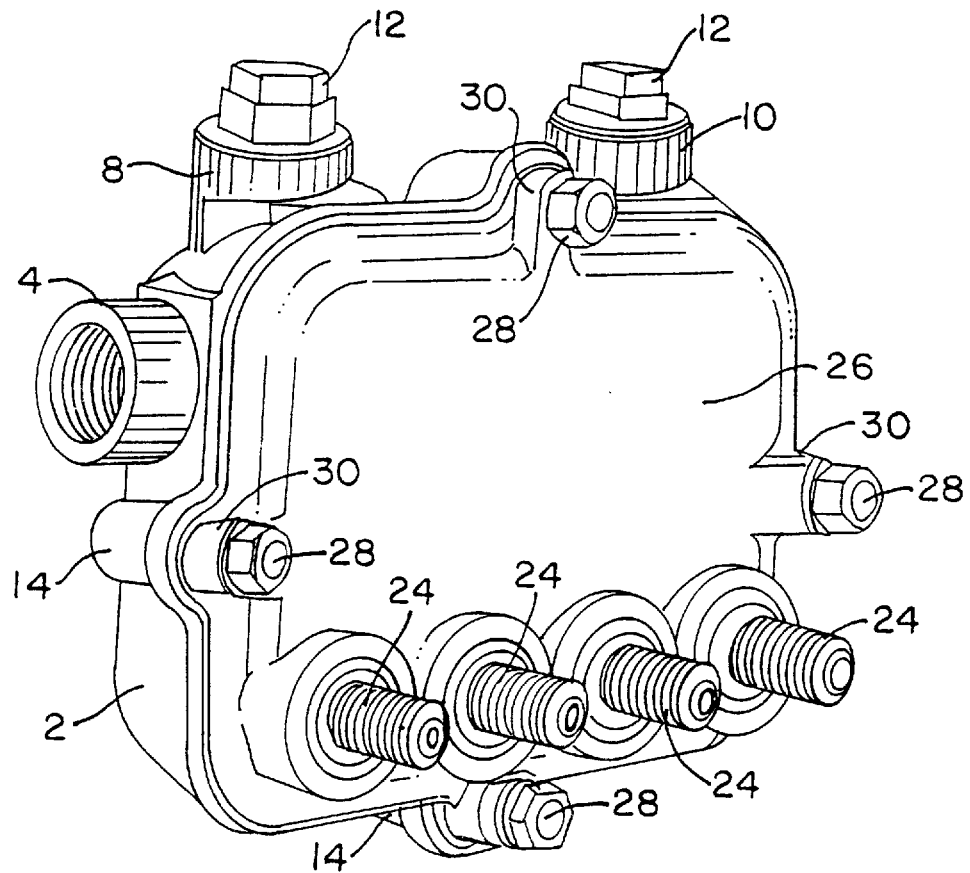
FIG. 2 is a pictorial drawing showing the cover plate secured to the opposite face of the multi-tap housing of FIG. 1, along with the associated output tap connectors for distributing a television signal to as many as four individual customers, in this example.

With further reference to FIG. 2, the opposing face of the multi-tap device of FIG. 1 is shown to include in this illustration four output tap connectors 24, respectively. However, any desired number of output tap connectors may be provided to a practical limit, and also less than four output tap connectors 24 may also be provided. The tap plate cover 26 is secured to the main housing 2 via captive mounting screws 28, as shown. Note that the output tap connectors 24 are mounted on the cover plate in a manner permitting electrical connection to the respective connectors 24 from the inside or bottom face of the tap plate cover 26. For at least one embodiment of the invention, the multi-tap housing configuration of FIGS. 1 and 2 remains unchanged. However, the present invention is not limited to the aforesaid configuration of FIGS. 1 and 2. The tap plate cover 26 also includes mounting screw bosses 30, respectively, for receiving the captive mounting screws 28, respectively, in this example.

Figure 3:
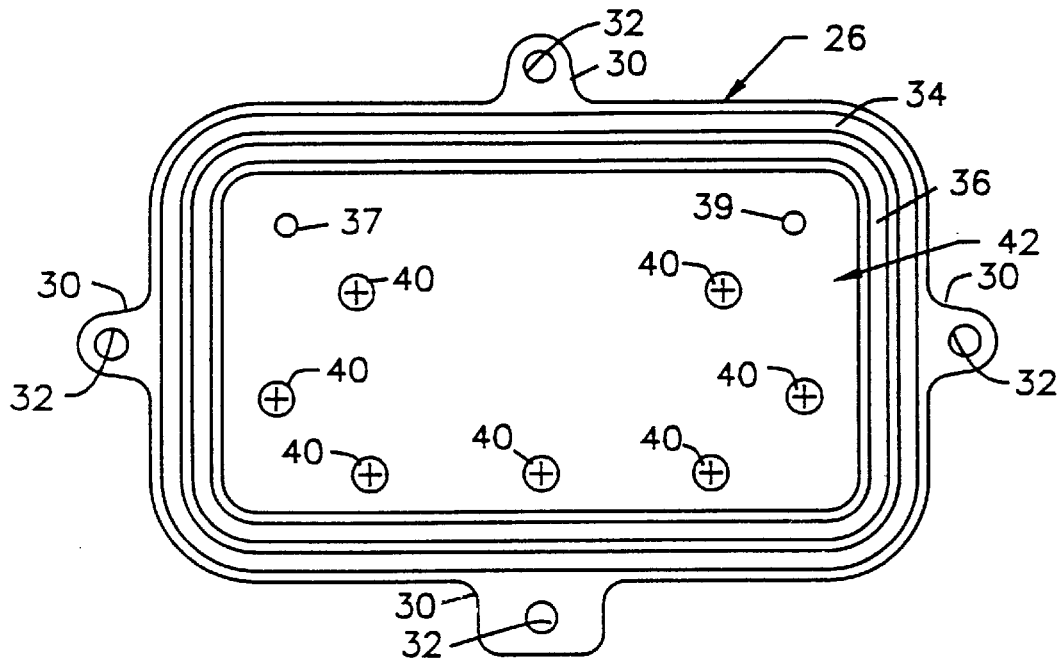
FIG. 3 shows the interior assembly of the tap plate as secured to the inside face of the tap plate cover for a multitap housing cover.

With reference to FIG. 3, the assembly of the tap plate printed circuit board 42 to the interior side of the tap plate cover 26 is shown. Tap plate printed circuit board 42 is secured thereto via mounting screws 40. Individual electrical connections (not shown) are made between circuitry on printed circuit board 42 and the output tap connectors 24, respectively, for providing attenuated TV signals to each of the connectors 24, respectively. In this example, the top of an electrical connection post 39, is located at the rf and/or ac power output to the tap plate 42, and the electrical connection post 37 is located at the rf/ac power input of the tap plate 42. Also shown in this example are threaded mounting screw holes 32, a weather or rubber gasket 34 for providing a weather tight seal between the tap plate cover 26 and the main housing 2. Also, an rf gasket 36 is incorporated in the tap plate cover 26 for providing rf shielding to the associated multi-tap device.

Figure 4:
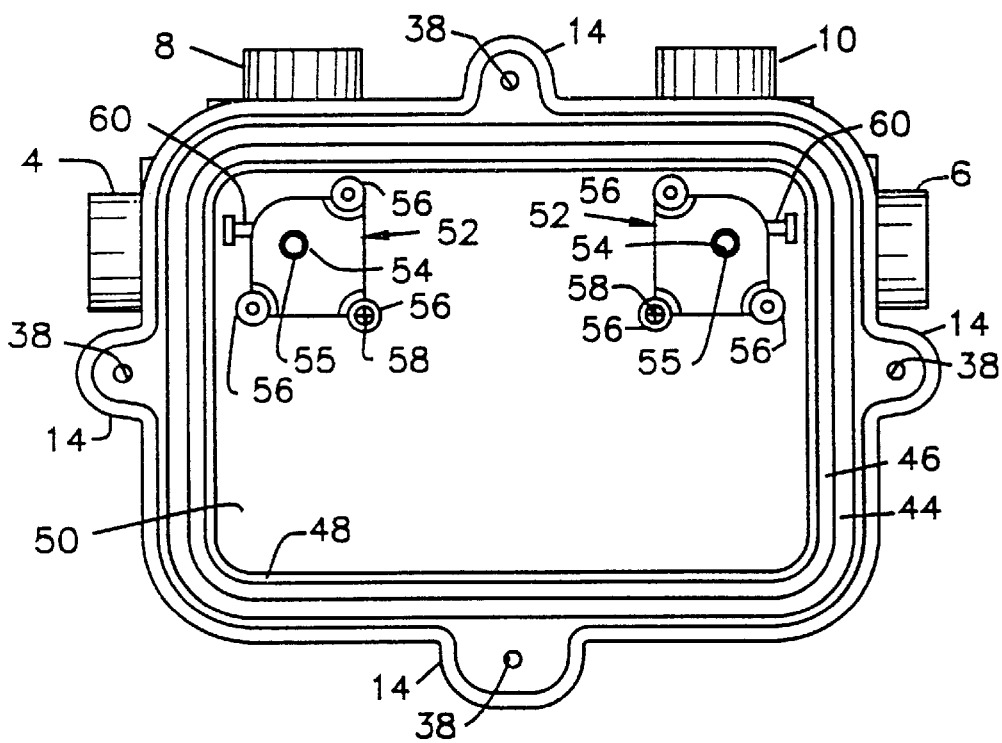
FIG. 4 is a pictorial of the interior of the prior multitap apparatus of the main housing with the tap plate/cover removed, exposing two seizure socket assembly housings.

With reference to FIG. 4, the tap plate 42 of FIG. 3 is removed, exposing the underlying seizure socket assemblies 52 of the known multi-tap device, which are mounted in the main housing via mounting bosses 56 on the socket assembly housings 52 and mounting screws 58, as shown. Holes 55 are provided in the tops of the seizure socket assembly housings 52 for providing access to seizure sockets 54, as shown. As will be described in greater detail below, the seizure sockets 54 are adapted for receiving the electrical connection post 37 and 39, respectively, for connecting the input and output main rf cable to the tap plate 42. Obviously, the main TV signal for attenuation by circuitry on the tap plate 42 for connection to connectors 24 is derived from the signal brought in on electrical connection post 37. In this example, the main housing 2 further includes a step-down recess 44, a channel 46 for receiving the o-ring 34, and a protruding lip 48 for engaging the rf gasket 36 installed in the cover 26, as indicated above. Otherwise, the interior portion of the main housing 2 with seizure socket assemblies 52 installed as shown, is further configured to have sufficient depth and open area for accommodating the components (not shown) of the tap plate 42.

Figure 10A:
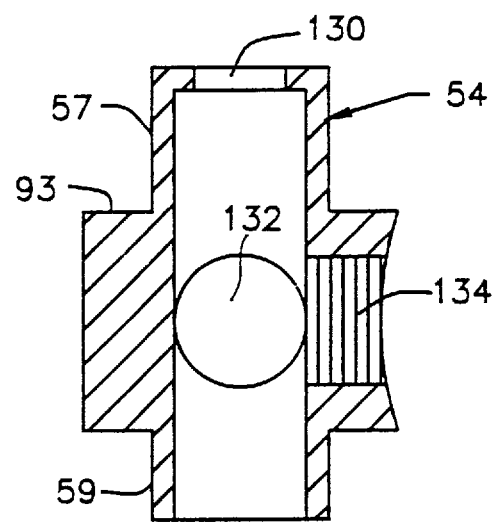
FIG. 10A is a longitudinal cross sectional view of a seizure socket of one embodiment of the invention.
Figure 10C:
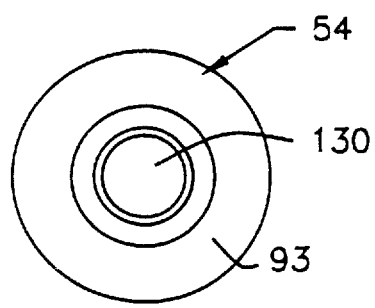
FIG. 10C is a top view of the seizure post of FIG. 10A.
Figure 10B:
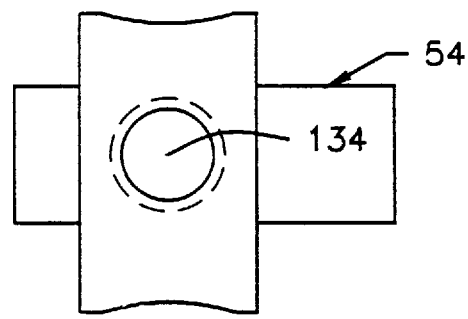
FIG. 10B is a side elevational view taken from the right side of the seizure post of FIG. 10A.

With further reference to FIG. 4, both of the seizure socket assemblies 52 are configured for permitting an rf cable securement screw 60 in each assembly housing 52 to be rotatable along with its associated seizure socket 54 through 90°. For purposes of further illustration, please refer to FIGS. 10A through FIG. 10C, showing a seizure socket 54 in detail. The center conductor of an rf cable, in this example, installed through output port 8 is inserted through the hole 132 of socket 54, the associated set screw 60 screwed into hole 134 is tightened against the center conductor of the output rf cable (not shown) for securing the same to the associated seizure socket 54. In a like manner, an input rf cable has its center conductor secured through input port 10 to the other seizure socket 54. In this latter example, the associated rf input and output cables (not shown) are in parallel to one another at least where they exit from output and input ports 8 and 10. Note that in the positioning of the set screws 60 shown in FIG. 4, they can be tightened or loosened by inserting a screwdriver through the other output port 4 and the other input port 6, where after port caps 12 are screwed into ports 4 and 6 for closing them off. If it is desired to have the input rf cable installed through input port 6, screw 60 is rotated through 90° to be positioned opposite input port 10, for permitting the input rf cable to be installed to the seizure socket 54 through input port 6 and a screwdriver into port 10, in a manner as previously described. Similarly, if it is desired to install the output rf cable through output port 4, the associated set screw 60 of the left-hand socket assembly 52, in this example, is rotated through 90° to be opposite output port 8, with output port 4 providing access by a screwdriver to the associated set screw 60.

Note that the particular known multi-tap device illustrated in FIGS. 1–4 is a model MGT24-11, sold by Antornix Inc., of Cranbury, N.J. As described below, the present invention is illustrated as a modification of this known multi-tap configuration, but is not limited thereto, in that the various features of embodiments of the present invention are applicable for use in many other multi-tap configurations, as would be understood by one of skill in the art.

Figure 5:
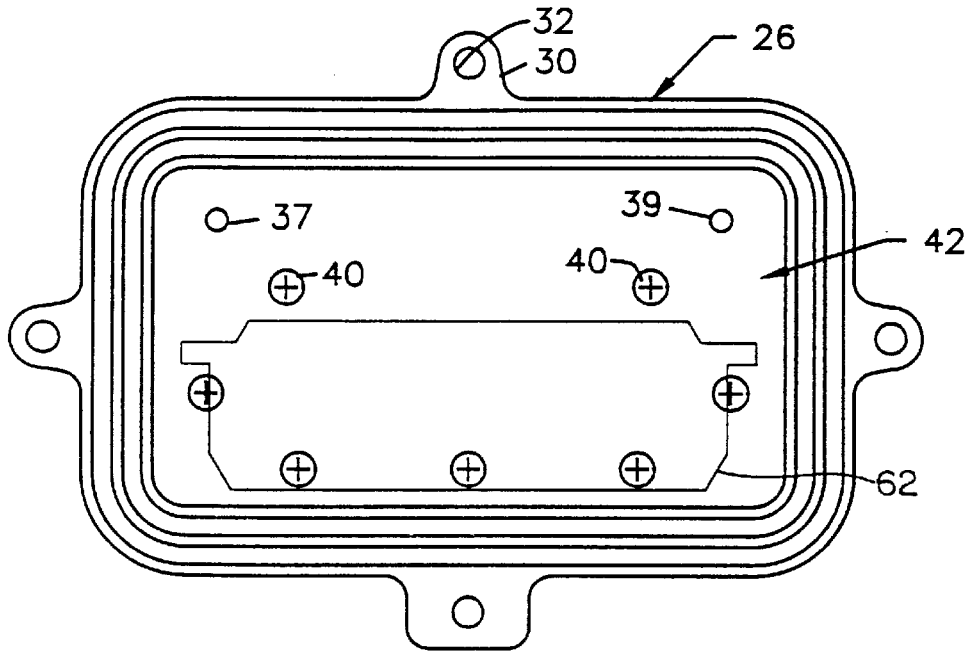
FIG. 5 is a pictorial illustration of the interior assembly of a main housing cover and tap plate for one embodiment of the invention.

With reference to FIG. 5, in one embodiment of the invention an insulator cover 62 is installed over a portion of the tap plate printed circuit board 42, as shown. The cover 62 provides both protection of underlying electrical components (not shown) protruding from the tap plate printed circuit board 42, in addition to improved electrical isolation thereof.

Figure 6:
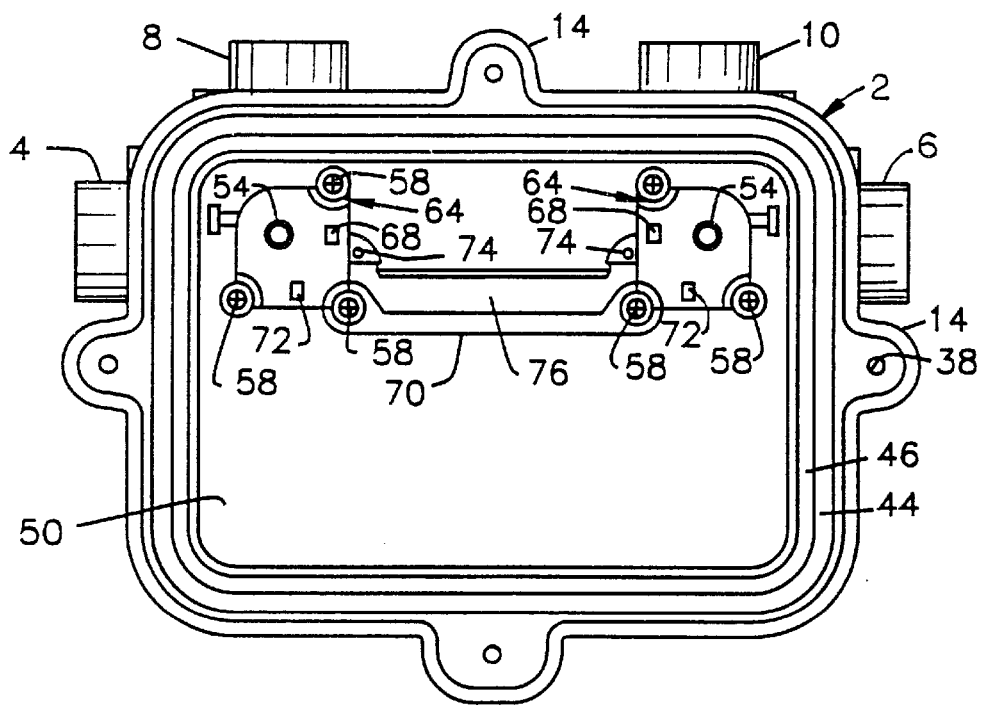
FIG. 6 is a pictorial illustration of the interior of the main housing with the associated cover and tap plate assembly removed, exposing two seizure socket assemblies, portions of a shunt printed circuit board, and switching mechanism cam heads for one embodiment of the invention.

With reference to FIG. 6, in a preferred embodiment of the invention, the seizure socket assemblies 52 of the known device are modified to be configured as shown by the seizure socket assemblies 64. As will be described in greater detail below, and further with reference to FIG. 7, holes 72 are provided through the top portion of the socket assembly housing 78 for permitting the cam head 136 of a cam 88 to protrude through one of the holes 72 depending upon whether the particular modified seizure socket assembly is to be used at the input or output side of the associated multi-tap device. In the example of FIG. 6, the cam heads 136 protrude through an associated hole 72 and are covered by a cam spring cap 68. Note that the cam spring cap 68 is only used in applications where dimensional tolerances of the associated multi-tap device require the, cam spring caps 68, for increasing the effective surface area of the cam heads 136. A shunt printed circuit board 70 is secured via mounting screws 58 to the modified seizure socket assemblies 64, respectively, as shown. An electrical conductive path 76 for rf signals and ac power is provided o n the s hunt printed circuit board 70. Rivets 74 are used for attaching spring contacts 96 to protruding tabs 144 (see FIG. 7) of printed circuit board 70 as shown.

Figure 7:
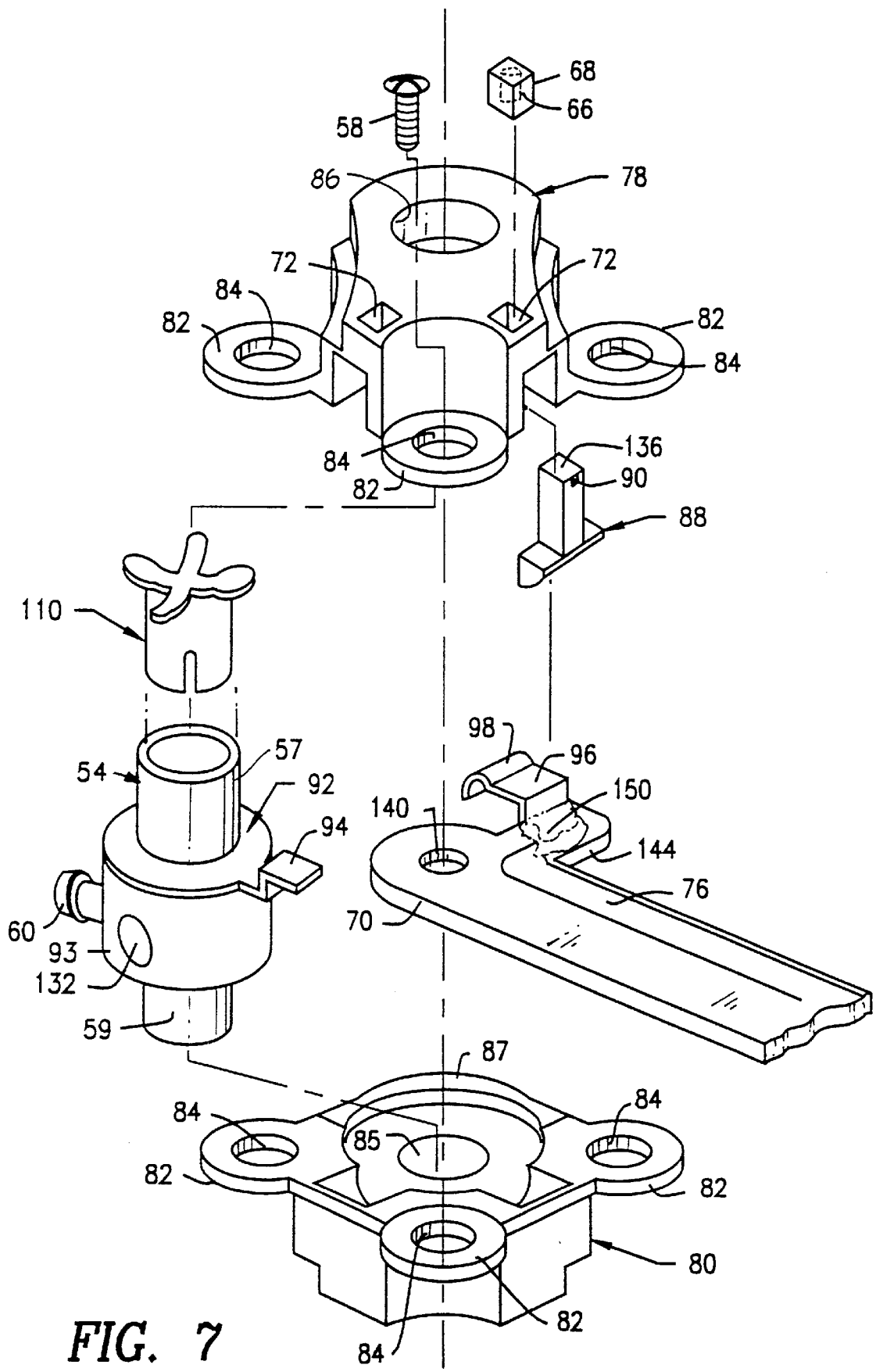
FIG. 7 is an exploded assembly diagram for one embodiment of the invention.

With further reference to the exploded assembly view of FIG. 7, showing the assembly of the left-hand modified seizure socket assembly 64 with the shunt printed circuit board 70 and associated spring contact 96, it should be noted that the right-hand modified seizure socket assembly 64 is similarly connected to the other end of printed circuit board 70 and associated spring contact 96, as further illustrated below. As shown, the assembly includes the top portion 78 of socket assembly housing 64, the lower portion 80 thereof, mounting bosses 82 of associated top portion 78 and lower portion 80 of housing 64, associated screw holes 84 of the latter, a hole 86 in the top portion 78 for receiving the upper portion 57 of seizure socket 54, a central hole 85 through the lower portion of socket assembly housing 52 for receiving the lower portion or section 59 of seizure socket 54, a stop tab 90 on cam 88, a contact ring 92 mounted on a central portion 93 of seizure socket 54 for electrical connection therebetween, a stationary contact 94 of contact ring 92, a spring contact head 98 of spring contact 96, a modified seizure socket spring insert 110, and mounting screw holes 140 of shunt printed circuit board 70. Note that as will be discussed in further detail below, in the preferred embodiment of the invention, the modified spring insert 110 of FIGS. 9A through 9C is used, but alternatively the prior spring insert 100 shown in FIGS. 8A through 8C can also be used. With further reference to FIG. 7, note that the lower socket assembly housing portion 80 includes a 90° step down portion 87 that forms one half of a 90° open slot with a similar step down portion of the top socket housing portion 78 (not shown), for providing a 90° open slot for permitting rotation of the set screw 60 and its associated seizure socket 54, as previously described for the known multi-tap device illustrated.

Figure 8A:
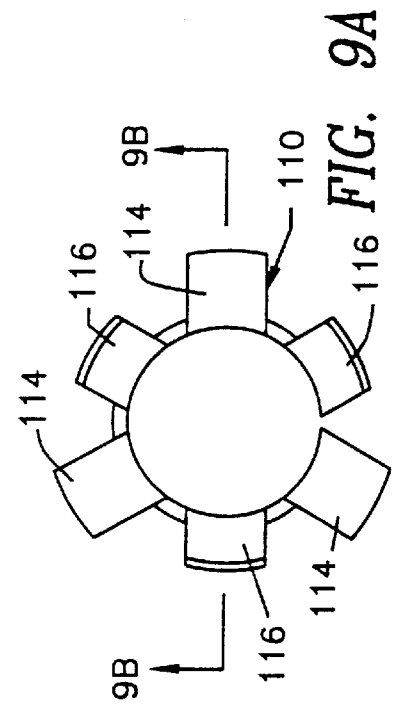
FIG. 8A is a top view of a prior seizure socket spring insert.
Figure 8B:
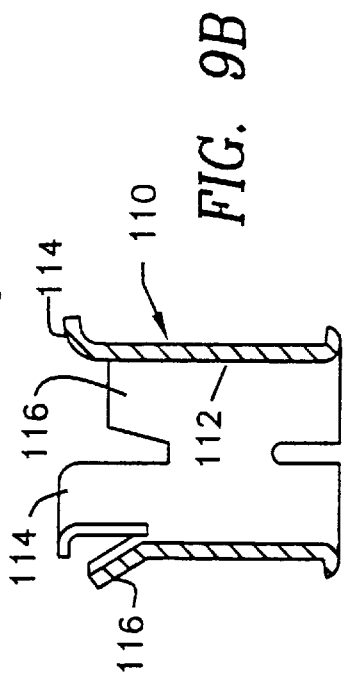
FIG. 8B is a cross sectional view taken along 8B—8B of FIG. 8A.
Figure 8C:
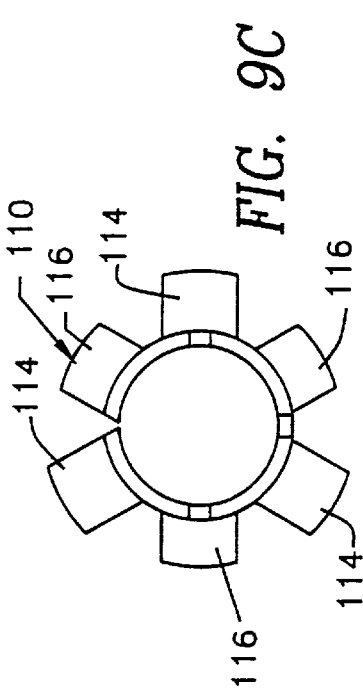
FIG. 8C is a bottom view of the seizure socket spring insert of FIGS. 8A and 8B.
Figure 9A:
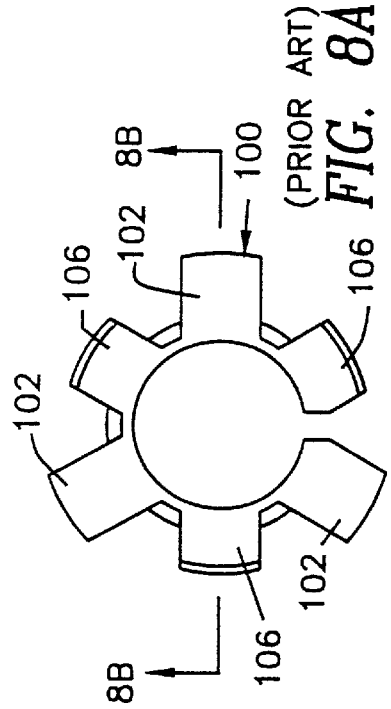
FIG. 9A is a top view of a modified seizure socket spring insert for one embodiment of the invention.
Figure 9B:
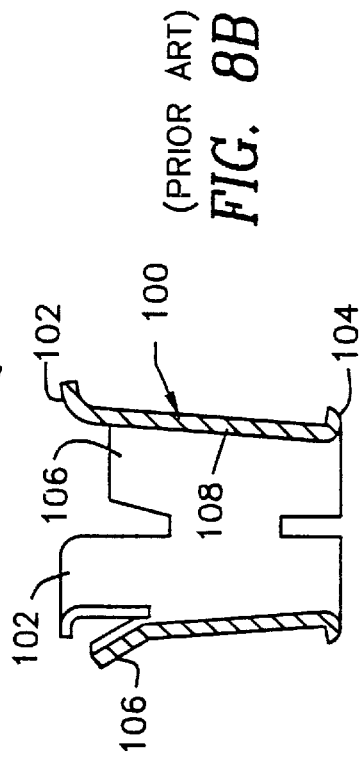
FIG. 9B is a cross sectional view taken along 9B—9B of FIG. 9A.
Figure 9C:
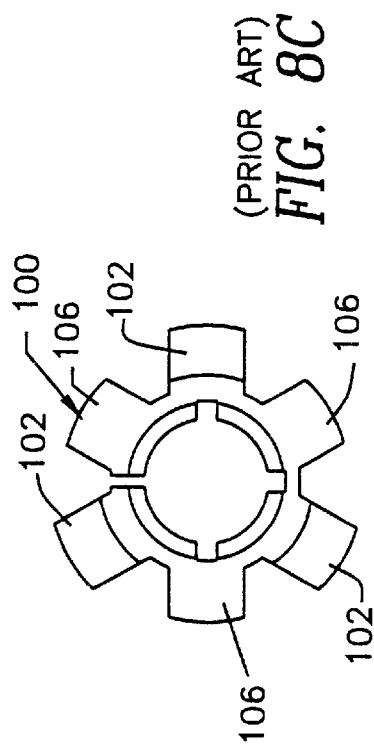
FIG. 9C is a bottom view of the modified seizure socket spring insert of FIG. 9A.

With reference to FIGS. 8A through 8C, the known multi-tap device illustrated in FIGS. 1 through 4 further includes a seizure socket spring insert 100 for insertion into the top of the seizure socket 54, as shown in FIG. 7. The spring insert 100 adapts the seizure socket 54 for receiving one of the electrical posts 37 or 39 of tap plate printed circuit board 42, in this example. As shown, the prior spring insert includes top retaining tabs 102, a bottom flange 104, side retention tabs 106 for securing the spring insert 100 into an associated socket 54, and downwardly converging sidewall portions 108.

As previously indicated, the spring insert 100 can be used in the assembly of FIG. 7 in substitution for the preferred spring insert 110, but best performance will be obtained through use of the modified spring insert 110. The latter is shown in detail in FIGS. 9A through 9C, as will be immediately described. The preferred spring insert 110 includes substantially parallel side wall portions 112 having an inside diameter dimensioned for insuring that electrical contact will be maintained with one of the electrical pins 37 or 39 of tap plate 42 as long as a portion of a pin is located between the interior sidewall portions 112 of spring insert 110. The preferred spring insert 110 also includes top retaining tabs 114, and side retention tabs 116. Note that the converging downward interior sidewalls 108 of the prior spring insert 100 will cause electrical contact with one of the electrical pins 37 or 39 of tap plate printed circuit board 42 to be interrupted before the associated pin is completely withdrawn from the spring insert 100, which is undesirable as will be shown from the below described description of the operation of the invention.

The seizure socket 54 is shown in detail in FIGS. 10A through 10C. The configuration shown is as used in the previously described known multi-tap device illustrated in FIGS. 1 through 4. The seizure socket 54 includes an upper section 57, a lower section 59, a central portion 93, a hole 130 for receiving a seizure socket spring 100 or preferably 110, a hole 132 for receiving an rf conductor, and a threaded hole 134 for receiving the rf cable securement set screw 60.

Figure 11:
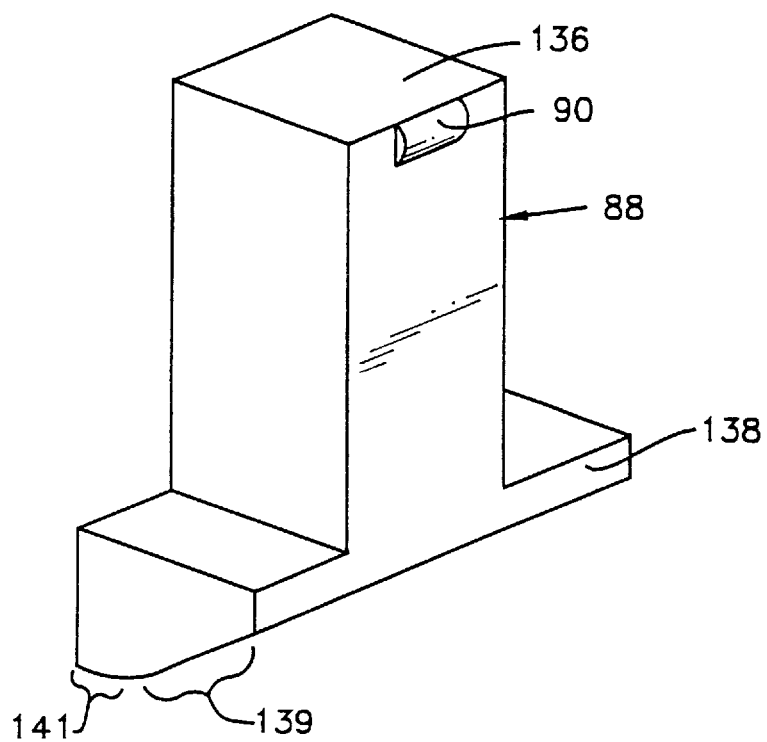
FIG. 11 is a pictorial view of a cam for one embodiment of the invention.

FIG. 11 is an enlarged pictorial view of cam 88. As shown, the cam is T-shaped, and includes a base portion 138, and a stem portion terminating in a cam head 136. A stop tab 90 is shown in this example for limiting the extreme downward travel of cam 88 when in use, as will be described below. The cam may be made from any suitable plastic material such as Delrin®, for example. Note also that the seizure socket assembly housing 52, and the modified housing as used in the present invention, can be made from any suitable plastic material. The width of the bottom of the base 138 is curved as shown to have a straight section 139 followed by a curved section 141. The straight section 139 substantially limits the bending of spring contact 96 as described below. The curved or convex section 141 permits a greater degree of tolerance for dimensional variations in the tap plate 42, the main housing 2, and the cover 26, for providing acceptable cam 88 operation or movement in bending spring contact 96, while preventing over bending thereof.

Figure 12:
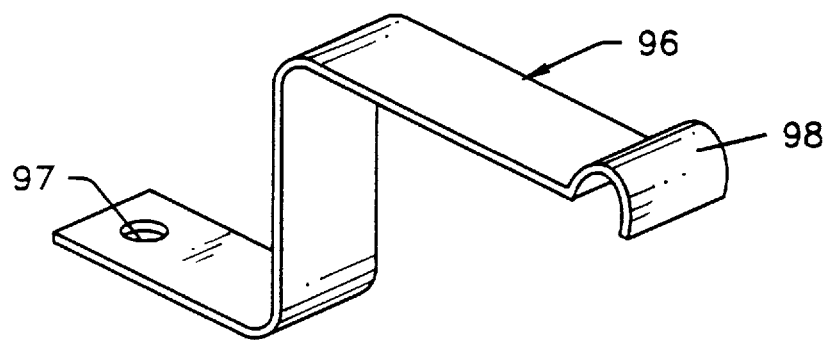
FIG. 12 is a pictorial view of a spring contact for one embodiment of the invention.

An enlarged pictorial view of the spring contact 96 is shown in FIG. 12. As shown, the spring contact 96 is shaped to include at one end a mounting hole 97, and at its other end a spring contact head 98.

Figure 13A:
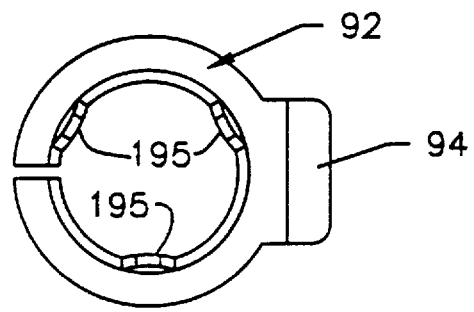
FIG. 13A is a pictorial view of the top of a contact ring for one embodiment of the invention.
Figure 13B:
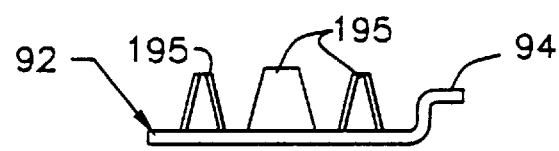
FIG. 13B is a side elevational view of the contact ring view of FIG. 13A.

The stationary electrical contact 94 is provided as part of a contact ring 92 as shown in FIGS. 13A and 13B. More specifically, the contact ring 92 includes mounting tabs 95 about the inner circumference of the ring portion thereof, as shown.

Figure 14A:
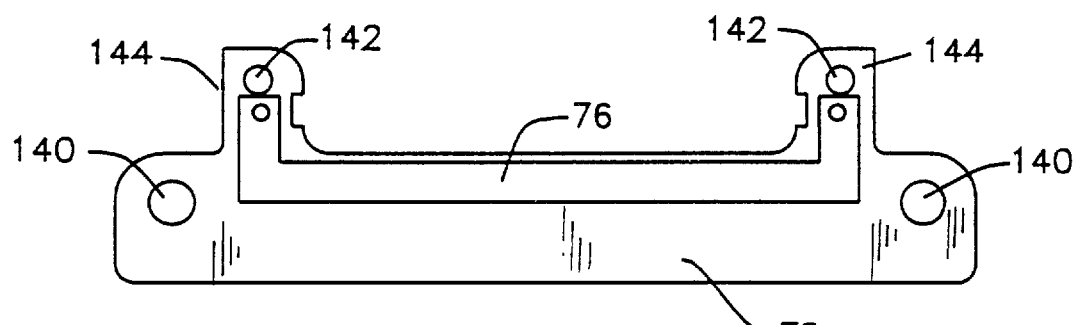
FIG. 14A is a top view of a printed circuit board and its associated electrical conductor path for one embodiment of the invention.
Figure 14B:
FIG. 14B is a side elevational view of the printed circuit board of FIG. 14A.

In FIG. 14A, a top view of the shunt printed circuit board 70 is shown to include a conductor path or metallization 76, two outwardly extending tabs 144 proximate either end, respectively, with each tab 144 including a rivet hole 142, as shown. Also, screw holes 140 are provided at either end of the shunt printed circuit board 70. A side elevational view or edge view of the shunt printed circuit board 70 is shown in FIG. 14B.

Note that the seizure socket spring insert 100, and modified insert 110, can be fabricated from any suitable electrically conductive material. In this example, the material is nickel plated phosphor bronze. Also, the main housing 2 and cover 26 may be fabricated from any suitable material. For example, they can be fabricated from cast aluminum material. Spring contact 96 and contact ring 94 may be fabricated from phosphor bronze, or any other suitable electrically conductive material.

Figure 15:
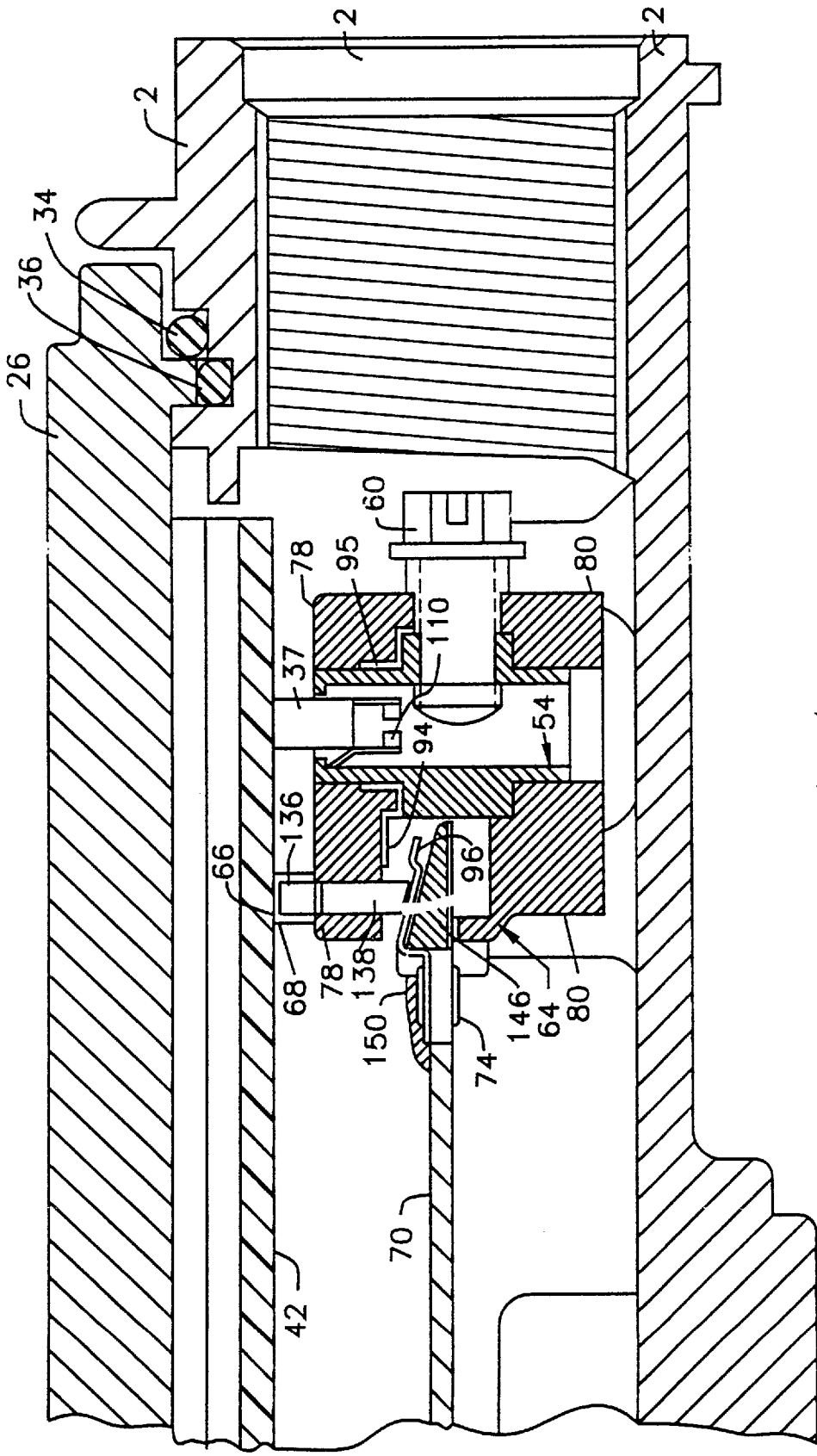
FIG. 15 is a partial cross sectional and pictorial view of an interior portion of the multi-tap device for showing features of the switching mechanism for one embodiment of the invention, with the switching mechanism in an open switch or inactive condition.

FIG. 15 shows a partial cross section and pictorial view through a modified seizure socket assembly 64, with the tap plate cover 26 and associated tap plate 42 secured in place to the main housing 2. As shown, the printed circuit board 42 pushes against the cam spring cap 68 for forcing the cam 138 downward against spring contact 96, causing the spring contact 96 to be disconnected from the stationary contact 94, that is the switch provided by spring contact 96 and stationary contact 94 is in its open condition. Also, an electrical connection post 37 is engaged within a seizure socket spring insert 110 for electrical connection to the input rf cable, in this example. Note that for sake of simplicity the center conductor of the associated rf cable is not shown, but it is assumed that it would be secured within the seizure socket 54 via the rf cable securement screw 60. Note also that in this example, a wedge stop 146 for limiting the travel of spring contact 96 is secured within the modified seizure socket assembly 64. However, it is expected that in many applications the wedge stop 146 will not be used. Its purpose is to prevent over bending of spring contact 96 to the extent that it will lose its memory for returning to its rest position for engaging stationary contact 94 whenever the cam 138 can be pushed upward via the spring tension of spring contact 96 when the tap plate cover 26 and associated printed circuit board 42 are removed, as will be described further.

Figure 16:
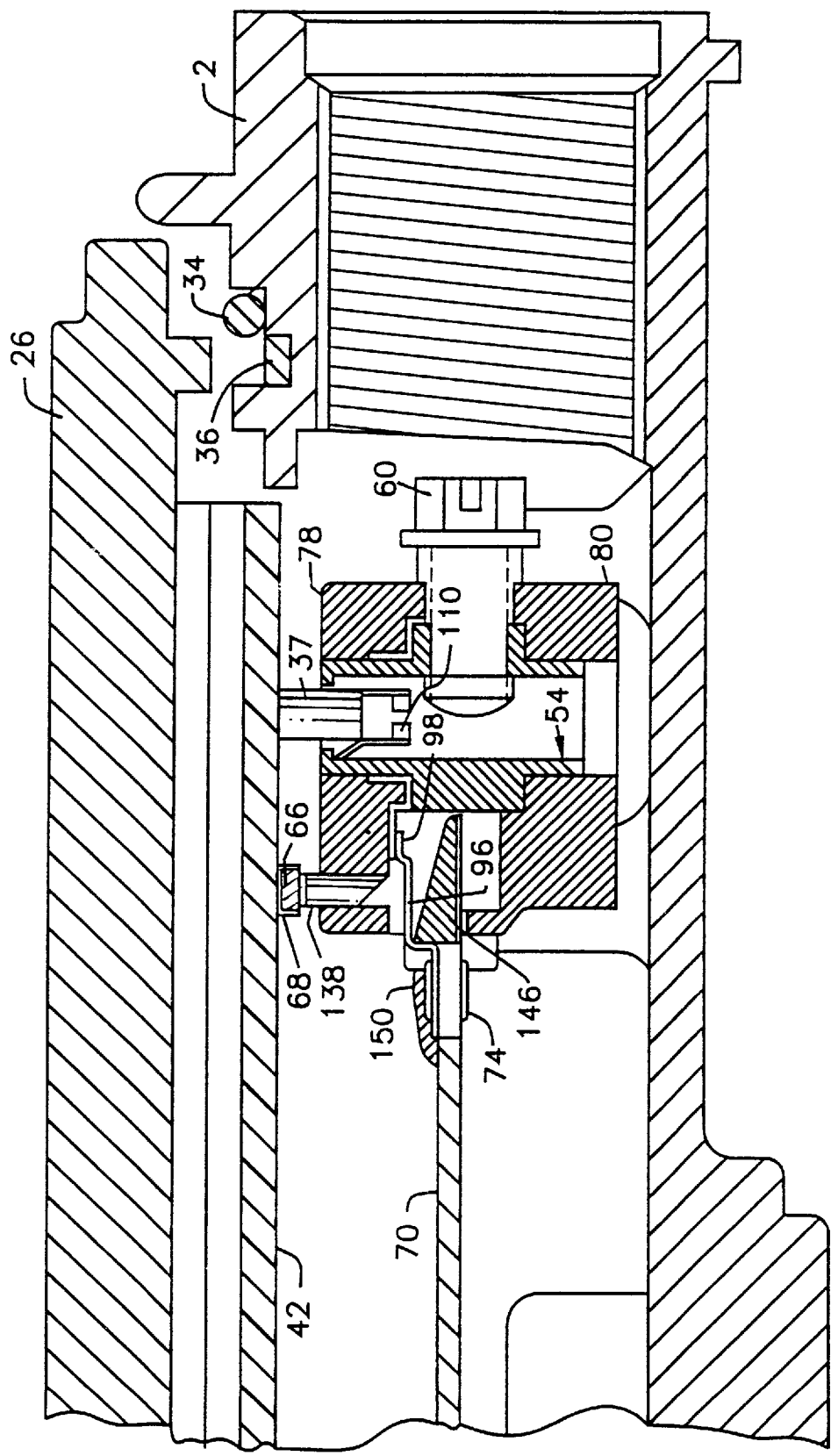
FIG. 16 is a partial cross sectional and partial pictorial view of a portion of the multi-tap device showing the switching mechanism in an activated state with the cover plate and associated tap plate at an intermediate position just before removal from or just upon initial installation into the main housing, for one embodiment of the invention.

An important aspect of the present invention is that the switching configuration provides for spring contact head 98 to mechanically contact and electrically engage the stationary contact 94 before the electrical connection post 37 disengages from electrical interconnection with the modified seizure socket spring insert 110. This feature is illustrated in FIG. 16, showing the positioning of a various associated elements at a time when the tap plate cover 26 is about to be completely removed from the main housing 2, or is at the initial stage of just being installed onto the main housing 2. In this manner, the input cable is always electrically connected to the output cable, either via tap plate pcb 42 when cover 26 is installed on housing 2, and/or via the electrical conduction path formed by the seizure sockets 54 of electrical conductive material connected to input and output cables, contact rings 92 with respective stationary contacts 94, to spring contacts 96 electrically connected to opposite ends, respectively, of the metal path 76 of pcb 70.

With further reference to FIGS. 7 and 15, note that to insure good electrical contact between the spring contact 96 and the electrical conduction path or metallization 76 on printed circuit board 70, solder 150 is deposited therebetween, as shown.

With further reference to FIGS. 15 and 16, for purposes of simplicity, the example shown is with relation to the input side of the multi-tap device. However, the output side relative to the present invention is configured in substantially the same manner with the output rf cable secured to the output seizure socket, and operates in the same way, for providing the previously described switching action, and so forth. Also, in different applications, depending upon the configuration of the tap plate 42, the electrical connection post 37 may be associated with the output side, and the electrical connection post 39 with the input side.

Although various embodiments of the present invention have been shown described herein, they are not meant to be limiting. Those of skill in the art may recognize various modifications to the present invention, which modifications are meant to be covered by the spirit and scope of the appended claims. For example, the spring cap 68 may include a coil spring 66 for permitting the cap to move further onto the cam 88 after the spring contact 96 has reached its maximum allowed bending, in order to provide further latitude for dimensional tolerance variations in the main housing 2, cover 26, and tap plate printed circuit board 42. Note that the tension of the spring 66 is typically made greater than the spring constant of bending for spring contact 96.

What is claimed is:

1. An r.f. signal and ac power distribution device comprising:

a main housing having a bottom, sides, and an open top portion;

a housing cover for installation on the top of said main housing to provide closure thereof, said housing cover having top and bottom face portions;

a printed circuit board mounted on the bottom of said housing cover, including:
  circuitry including means for conducting r.f. signals and ac power;
  an input electrical connection post for receiving a main r.f. signal and ac power, and
  an output electrical connection post for outputting said main r.f. signal and ac power after passing through said circuitry;

is input and output seizure socket assemblies mounted in spaced relation inside the top portion of said main housing, for receiving said input and output electrical connection posts, respectively, for electrically connecting the posts to input and output main r.f. cables, respectively;

electrically conducive means mounted between said input and output seizure socket assemblies; and said input and output seizure socket assemblies further including first and second switching means, respectively, each responsive to said cover and printed circuit board being removed from said main housing for electrically connecting said input and output seizure socket assemblies to said electrically conductive means just before said input and output electrical connection posts are electrically disconnected from said input and output seizure socket assemblies, for providing an uninterruptable electrical connection between said input and output seizure socket assemblies, and input and output cables connected thereto, respectively.

2. The device of claim 1, wherein said input seizure socket assembly includes:

a socket housing including top and bottom sections;

seizure socket means for individually receiving, retaining, and electrically connecting to said input post of said tap plate;

said seizure socket means further including means for retaining and electrically connecting to a central conductor of said input r.f cable;

said first switching means including:

a contact ring electrically connected to and mounted on said seizure socket means, said contact ring having a stationary electrical contact ring having a stationary electrical contact projecting outward therefrom, said stationary contact having top and bottom surfaces;

an electrically conductive spring contact having one end rigidly attached to one end of the said shunt printed circuit board, and electrically connected to one end of said electrically conductive strip, a free end of said spring contact having top and bottom surfaces and being positioned to protrude into said socket housing to have an end of the top surface of said spring contract forcefully contact the bottom surface of said stationary electrical contact via spring pressure of said spring contact;

a cam mounted within the top section of said socket housing, said cam having a head portion protruding through a hole in the top section of said socket hosing, and having a base resting upon a top portion of the free end of said spring contact away from said stationary electrical contact, whereby whenever said housing cover and top plate printed circuit board are mounted upon said main housing, said top plate printed circuit board is positioned to push against the head of said cam, forcing said cam to push said spring contact free end away from said stationary electrical contact to break the electrical connection therebetween.

3. The multi-tap device of claim 2, wherein said input seizure socket assembly includes:

a socket housing including top and bottom sections;

seizure socket means for individually receiving, retaining, and electrically connecting to said output post of said tap plate;

said seizure socket means further including means for retaining and electrically connecting to a central conductor of said output rf cable;

said second switching means including:

a contact ring electrically connected to and mounted on said seizure socket means, said contact ring having a stationary electrical contact projecting outward therefrom, said stationary contact having top and bottom surfaces;

an electrically conductive spring contact having one end rigidly attached to one end of said shunt printed circuit board, and electrically connected to one end of said electrically conductive strip, a free end of said spring contact having top and bottom surfaces, and being positioned to protrude into said socket housing to have an end of the top surface of said spring contact forcefully contact the bottom surface of said stationary electrical contact via spring pressure of said spring contact;

a cam mounted within the top section of said socket housing, said cam having a head portion protruding through a hole in the top section of said socket housing, and having a base resting upon a top portion of the free end of said spring contact away from said stationary electrical contact, whereby whenever said housing cover and top plate printed circuit board are mounted upon said main housing, said top plate printed circuit board is positioned to push against the head of said cam, forcing said cam to push said spring contact free end away from said stationary electrical contact to break the electrical connection therebetween.

4. The device of claim 3, wherein said input and output posts are of sufficient length to remain both in mechanical and electrical contact with said seizure socket means of said input and output seizure socket means, respectively, as said cover and tap-plate printed circuit board are being removed from said main housing, until said spring contact makes an electrical connection with said stationary electrical contact as a result of said cam moving away from spring contact, thereby providing a make-before-break operation.

5. The device of claim 3, wherein said seizure socket means of each of said input and output seizure socket assemblies include:

a seizure socket having a substantially cylindrical body with a longitudinal through hole having an inside first diameter, a central portion of said body being of greater outside diameter than upper and lower portions thereof, the upper portion being adapted for receiving said retaining means, a first hole through a side of said central portion for receiving the center conductor of an rf cable, and a threaded second hole spaced from said first hole through the side of said central portion, at the same level as said first hole, for receiving a set screw for securing said rf cable; and said socket housing including means for mounting said seizure socket therein for rotation through 90°.

6. The device of claim 5, wherein said retaining means includes:

an electrically conductive hollow bushing of spring material, said bushing having a top circumference with first tabs outwardly bent at 90° for retaining the bushing top at the top of its associated seizure socket, said bushing further having second tabs that are outwardly bent at an angle for securing the bushing within said seizure socket, the inside walls of said bushing portion below said first and second tabs having a diameter slightly less than that of said input and output posts.

7. The multi-tap device of claim 3, further including a cap for installation over said cam head for effectively increasing the surface area of the cam head.

8. The multi-tap device of claim 3, further including means for limiting the travel of said spring contact to prevent said spring contact from losing its spring memory.

9. The multi-tap device of claim 2, further including a spring cap for installation over said cam head for effectively increasing the length of the cam head.

10. The multi-tap device of claim 2, further including means for limiting the travel of said spring contact to prevent said spring contact from losing its spring memory.

11. The multi-tap device of claim 2, wherein said cam further has an inverted T-shape with the base being the horizontal portion of the T, said base being curved across a narrow width thereof relative to the length of said base, the curved width being formed with a straight segment for a portion furthest from said spring contact, and a convex segment following said straight segment, said convex segment terminating at a bottom edge of said base, the shape of said base permitting a greater degree of tolerance for dimensional variations in the tap plates printed circuit board, main housing, and cover, for insuring acceptable cam operation of movement in bending said spring contact, while preventing over bending thereof.

12. The device of claim 1, wherein said output seizure socket assembly includes:

a socket housing including top and bottom sections;

seizure socket means for individually receiving, retaining, and electrically connecting to said output post of said tap plate;

said seizure socket means further including means for retaining and electrically connecting to a central conductor of said output rf cable;

said second switching means including:
  a contact ring electrically connected to and mounted on said seizure socket means, said contact ring having a stationary electrical contact projecting outward therefrom, said stationary contact having top and bottom surfaces;
  an electrically conductive spring contact having one end rigidly attached to one end of said shunt printed circuit board, and electrically connected to one end of said electrically conductive strip, a free end of said spring contact having top and bottom surfaces, and being positioned to protrude into said socket housing to have an end of the top surface of said spring contact forcefully contact the bottom surface of said stationary electrical contact via spring pressure of said spring contact;
  a cam mounted within the top section of said socket housing, said cam having a head portion protruding through a hole in the top section of said socket housing, and having a base resetting upon a top portion of the free end of said spring contact away from said stationary electrical contact, whereby whenever said housing cover and top plate printed circuit board are mounted upon said main housing, said top plate printed circuit board is positioned to push against the head of said cam, forcing said cam to push said spring contact free end away from said stationary electrical contact to break the electrical connecting therebetween.

13. The device of claim 1, further including:

a plurality of output tap connectors mounted in holes through the top of said housing cover in a manner permitting electrical connection to each respective connector from the bottom portion of said cover; and said printed circuit board being configured as a top plate further including circuitry for attenuating or tapping off a portion of a main r.f signal, for electrical connection of the attenuated r.f signals to said output tap connectors, respectively.

14. An r.f. signal and ac power distribution device comprising:

a main housing having bottom, sides, and an open top portion;

a housing cover for installation on the top of said main housing to provide closure thereof, said housing cover having top and bottom face portions;

a printed circuit board mounted on the bottom of said housing cover, including:
  circuitry including means for conducting r.f. signals and ac power;
  an input electrical connection post for receiving a main r.f. signal and ac power; and
  an output electrical connection post for outputting said main r.f. signal and ac power after passing through said circuitry;

input and output seizure socket assemblies mounted in spaced apart relation inside the top portion of said main housing, for receiving said input and output electrical connection posts, respectively, for electrically connecting the posts to input and output main r.f. cables, respectively;

electrically conductive means mounted between said input and output seizure socket assemblies; and switching means, responsive to said cover and printed circuit board being removed from said main housing for electrically connecting said input and output seizure socket assemblies to said electrically conductive means just before said input and output electrical connection posts are electrically disconnected from said input and output seizure socket assemblies, for providing an uninterruptable electrical connection between said input and output seizure socket assemblies, and input and output cables connected thereto, respectively.

* * * * *